(12) United States Patent
Stoppe et al.

(10) Patent No.: US 10,247,933 B2
(45) Date of Patent: Apr. 2, 2019

(54) IMAGE CAPTURING DEVICE AND METHOD FOR IMAGE CAPTURING

(71) Applicant: Carl Zeiss Microscopy GmbH, Jena (DE)

(72) Inventors: Lars Stoppe, Jena (DE); Max Funck, Weimar (DE); Andrea Berner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/506,352

(22) PCT Filed: Aug. 27, 2015

(86) PCT No.: PCT/EP2015/069678
§ 371 (c)(1),
(2) Date: Feb. 24, 2017

(87) PCT Pub. No.: WO2016/030474
PCT Pub. Date: Mar. 3, 2016

(65) Prior Publication Data
US 2017/0261741 A1   Sep. 14, 2017

(30) Foreign Application Priority Data

Aug. 29, 2014   (DE) .................. 10 2014 112 416
Sep. 3, 2014   (DE) .................. 10 2014 112 666

(51) Int. Cl.
*G02B 21/36* (2006.01)
*G06T 5/50* (2006.01)
(Continued)

(52) U.S. Cl.
CPC .............. *G02B 21/367* (2013.01); *G06T 5/50* (2013.01); *H04N 1/6027* (2013.01);
(Continued)

(58) Field of Classification Search
CPC ........ G02B 21/367; G06T 2207/10016; G06T 2207/10152; G06T 2207/20221; G06T 5/50; H04N 5/2256
See application file for complete search history.

(56) References Cited

U.S. PATENT DOCUMENTS

2010/0214446 A1\* 8/2010 Watarai .................. H04N 5/772
348/231.99
2012/0098950 A1\* 4/2012 Zheng .................... G02B 21/06
348/79
(Continued)

FOREIGN PATENT DOCUMENTS

DE   102004012125 B3   9/2005
DE   102007001010 A1   7/2008
(Continued)

OTHER PUBLICATIONS

International Search Report of PCT/EP2015/069678.

*Primary Examiner* — Behrooz M Senfi
(74) *Attorney, Agent, or Firm* — Seyfarth Shaw LLP; Brian Michaelis

(57) ABSTRACT

For image recording purposes, an object is illuminated at a plurality of illumination angles. A detector captures a plurality of images (41-43) of the object for the plurality of illumination angles. An electronic evaluating device applies an image correction to at least some of the plurality of images (41-43), said image correction comprising a displacement ($T_1$, $T_2$), wherein the displacement ($T_1$, $T_2$) depends on the illumination angle (4) used when recording the respective image (41-43). The corrected images (44-46) may be combined.

16 Claims, 8 Drawing Sheets

(51) Int. Cl.
*H04N 5/225* (2006.01)
*H04N 1/60* (2006.01)
*H04N 9/07* (2006.01)

(52) U.S. Cl.
CPC ............ *H04N 5/2256* (2013.01); *H04N 9/07* (2013.01); *G06T 2207/10016* (2013.01); *G06T 2207/10152* (2013.01); *G06T 2207/20221* (2013.01)

(56) References Cited

U.S. PATENT DOCUMENTS

| | | | |
|---|---|---|---|
| 2012/0176674 A1* | 7/2012 | Lippert | G02B 21/0032 359/388 |
| 2015/0071560 A1* | 3/2015 | Stoppe | G06T 5/003 382/260 |

FOREIGN PATENT DOCUMENTS

| | | |
|---|---|---|
| DE | 102008025658 A1 | 12/2009 |
| DE | 102012106584 A1 | 1/2014 |
| EP | 1746846 A1 | 1/2007 |
| EP | 2101207 A1 | 9/2009 |
| JP | 2009-219123 A | 9/2009 |
| JP | 2010-199650 A | 9/2010 |
| JP | 2013-542468 A | 11/2013 |
| WO | 2005/101854 A1 | 10/2005 |

\* cited by examiner

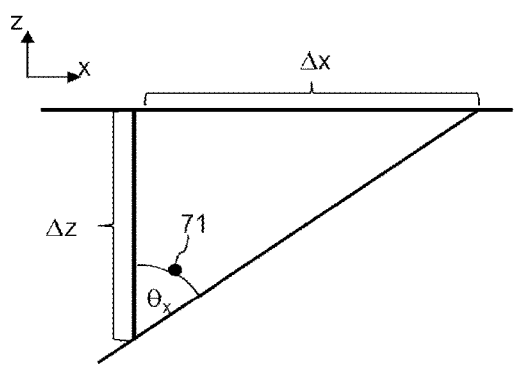
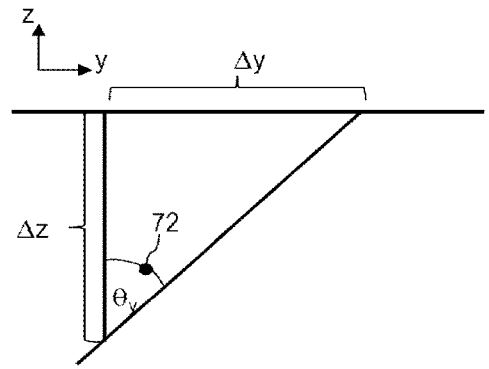
FIG. 6          FIG. 7
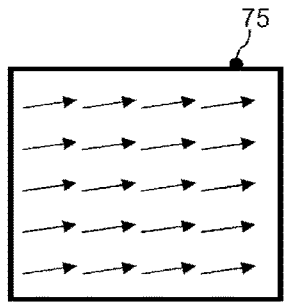
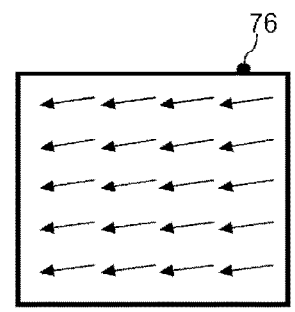
FIG. 8
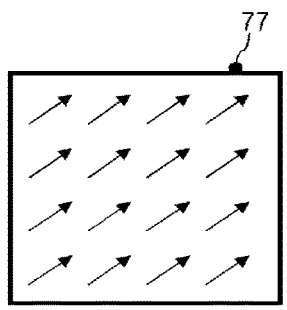
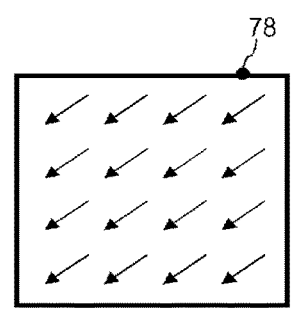
FIG. 9

IMAGE CAPTURING DEVICE AND METHOD FOR IMAGE CAPTURING

FIELD OF THE INVENTION

Embodiments of the invention relate to apparatuses and methods for recording images. In particular, embodiments relate to those apparatuses and methods which facilitate a computational correction of an optical aberration.

BACKGROUND

Modern optical systems should meet ever more stringent requirements in respect of image quality. To this end, use may be made of highly precise and high-quality optical units. Alternatively, use may be made of more cost-effective optical units in combination with subsequent postprocessing.

Higher-quality optical units may be used to generate high-quality images. However, in addition to disadvantages in terms of costs, this may also lead to a large installation space and a high weight. Moreover, a large number of lenses may increase the reflection susceptibility of the system and/or reduce the transmission. This may be disadvantageous for many applications, for example in the field of expensive specialist appliances.

Apparatuses and methods which combine cheaper optical units with subsequent postprocessing may contain deconvolution techniques in the digital further processing. Such techniques are often connected with high computational outlay. This may be found to be disadvantageous, in particular, if a fast calculation of an image is desired, for example for the real-time display of recorded specimen regions in a microscope system. A low contrast of the modulation transfer function (MTF) and/or a poor signal-to-noise ratio (SNR) of the image may lead to certain spatial frequencies determined using deconvolution techniques not being reconstructable or only being reconstructable under certain additional assumptions. By way of example, this may be the case for spatial frequency regions in which, on account of aberrations, the MTF has zeros. By way of example, such zeros in the MTF may occur in the case of astigmatism or defocus. Longitudinal chromatic aberrations may not be easily compensable by means of deconvolution techniques.

SUMMARY

There is a need for improved techniques for imaging an object. In particular, there is a need for apparatuses and methods which permit the use of cost-effective imaging optical units and which may reduce the computational complexity in the digital further processing compared to deconvolution techniques. In particular, there is a need for apparatuses and methods, by means of which longitudinal chromatic aberrations and/or an astigmatism are correctable.

According to the embodiments, apparatuses and methods, in which an object is illuminated at a plurality of illumination angles and an image is recorded in each case, are specified. The plurality of images are processed further by computation. In the process, a displacement may be applied to at least some of the plurality of images, said displacement depending on the illumination angle. Using the displacement, image regions may be displaced in space. After applying the displacement, the images may be summed or processed further in a different manner.

The displacement may be different for different color channels in order to correct a chromatic aberration. The displacement may be field-point-dependent in order to take account of influences which vary locally in the image plane, for example within the scope of astigmatism correction.

In the apparatuses and methods according to the embodiments, an image correction may be carried out in a computationally efficient manner without the images needing to be deconvolved with the respective point spread function (PSF). The problems which are conventionally linked to zeros of MTFs may be reduced by the illumination at a plurality of illumination angles and by taking account of the illumination angles in the computational processing of the images. Information losses may be reduced by virtue of the images captured at a plurality of illumination angles being combined. The combination may be carried out by operations such as a displacement and addition, which can be carried out in a computationally efficient manner and which may satisfy a real-time condition.

An image-recording apparatus according to one embodiment comprises an illuminating device which is controllable in order to set a plurality of illumination angles for illuminating an object. The image-recording apparatus comprises a detector comprising an image sensor, configured to capture a plurality of images of an object for the plurality of illumination angles. The image-recording apparatus comprises an electronic evaluating device for processing the plurality of images, coupled to the image sensor. The electronic evaluating device is configured to apply an image correction to at least some of the plurality of images, said image correction comprising a displacement, wherein the displacement depends on the illumination angle used when recording the respective image. The electronic evaluating device is configured to combine the plurality of images after the image correction.

The electronic evaluating device may be configured to correct chromatic aberrations by way of the processing.

The electronic evaluating device may be configured to correct longitudinal chromatic aberrations by way of the processing.

The electronic evaluating device may be configured to locally displace different color channels of an image relative to one another, wherein the displacement depends on the illumination angle when recording the image.

The image sensor may comprise a plurality of color channels. The displacement may depend on the respective color channel and the illumination angle when recording the respective image.

The displacement which is used in the coordinate space for a color channel may depend on a distance between a focal position for the color channel and a further focal position for a further color channel. It is thus possible to take account of a defocus between the color channels and the color-dependent geometric blur of object edges, connected therewith, may be reduced.

The distance between focal positions for at least two color channels may be stored in non-volatile fashion in a storage medium of the image-recording apparatus. Alternatively, or additionally, the focal positions for the color channels may be stored in non-volatile fashion in a storage medium of the image-recording apparatus. The electronic evaluating device may be configured to ascertain the displacement depending on the illumination angle for the color channels therefrom by way of calculation.

The detector may have a detector depth-of-field which is greater than the distance between focal positions for the different color channels.

Alternatively, or additionally, the electronic evaluating device may be configured to correct an astigmatism. For the purposes of correcting an astigmatism, the displacement may depend on the illumination angle in relation to one or more planes of the astigmatism. The displacement may depend on the illumination angle at which the object is illuminated in relation to a first plane, which is formed by a meridian, assigned to a first focal length, of an optical component and the optical axis. The displacement may depend on the illumination angle at which the object is illuminated in relation to a second plane, which differs from the first plane and which is formed by a further meridian, assigned to a second focal length, of the optical component and the optical axis.

The displacement may depend on a distance of focal positions for different planes of the imaging optical unit.

The electronic evaluating device may be configured to determine the components of the displacement in the image plane along two orthogonal directions, in each case depending on the illumination angle.

The displacement which is applied to an image captured at one illumination angle may depend on a position of a beam, incident at the illumination angle, in relation to a plane which is defined by an astigmatism axis and an optical axis of an imaging optical unit.

The displacement which is applied to an image captured at one illumination angle may depend on the position of the beam, incident at the illumination angle, in relation to a first plane which is defined by a first astigmatism axis and the optical axis and in relation to a second plane which is defined by a second astigmatism axis and the optical axis.

A component of the displacement along a first coordinate axis may depend on a projection of the beam incident at the illumination angle into the first plane.

A further component of the displacement along a second coordinate axis which is orthogonal to the first coordinate axis may depend on a projection of the beam incident at the illumination angle into the second plane.

The detector may have a detector depth-of-field which is greater than a distance between focal positions for the different planes of the astigmatism.

Alternatively, or additionally, the electronic evaluating device may be configured to correct a field curvature.

The detector may have a detector depth-of-field which is greater than a defocus caused by the combination of longitudinal chromatic aberrations, astigmatism and field curvature.

The displacement which is applied by the electronic evaluating device may be field-point-independent. The same displacement may be applied to each pixel of an image or of a color channel of the image in order to displace the image or the color channel of the image in the image plane.

The displacement which is applied by the electronic evaluating device may be field-point-dependent. As a result, it is also possible to correct distortions, for example caused by field curvature or astigmatism.

For the plurality of illumination angles, the displacement may be respectively stored in non-volatile fashion in a storage medium of the image-recording apparatus. Alternatively, or additionally, information about a defocus for different color channels or different planes of an astigmatism may be stored in non-volatile fashion in a storage medium of the image-recording apparatus, from which the electronic evaluating device calculates the displacement.

A displacement of an image or of a color channel of an image may comprise rounding of the displacement to an integer pixel spacing.

A displacement of an image or of a color channel of an image may comprise an interpolation between a plurality of pixel values if the displacement does not equal an integer pixel spacing of the image sensor.

The electronic evaluating device may be configured to add the plurality of images after the image correction in order to calculate a results image.

The electronic evaluating device may be configured to use the plurality of images after the image correction for Fourier ptychography. The electronic evaluating device may be configured to calculate a phase and amplitude distribution of the object. The electronic evaluating device may be configured to reconstruct a spectrum of the object in the coordinate space from the plurality of images corrected by the image correction and determine the phase and amplitude distribution of the object by a Fourier transform. The electronic evaluating device may be configured to calculate a phase-contrast image of the object from the plurality of images after the image correction.

The electronic evaluating device may be configured to use the plurality of images after the image correction for automatically determining a focal position and/or for phase-contrast methods.

The electronic evaluating device may be configured to apply the image correction onto an image which was captured for one illumination angle while the detector captures a further image for a further illumination angle. By parallelizing image correction and recording of further images at different illumination angles, the time required up to the provision of the results image may be reduced further.

The image-recording apparatus may be a microscope system. The images may be captured in a transmission arrangement. The images may be captured in a reflection arrangement.

A method for recording images according to one embodiment comprises capturing a plurality of images when an object is illuminated at a plurality of illumination angles. The method comprises processing the plurality of images. Here, an image correction is applied to at least some of the plurality of images, wherein the image correction comprises a displacement which depends on the illumination angle when recording the respective image. The plurality of images are combined after applying the image correction.

According to one embodiment, the method may be carried out automatically by the image-recording apparatus.

In the method, chromatic aberrations may be corrected by way of the processing.

In the method, longitudinal chromatic aberrations may be corrected by way of the processing.

Different color channels of an image may be displaced relative to one another, with the displacement depending on the illumination angle when recording the image.

An image sensor for capturing the images may comprise a plurality of color channels. The displacement may depend on the respective color channel and the illumination angle when recording the respective image.

The displacement for a color channel may depend on a distance between a focal position for the color channel and a further focal position for a further color channel.

The distance between focal positions for at least two color channels may be stored in non-volatile fashion in a storage medium of the image-recording apparatus. Alternatively, or additionally, the focal positions for the color channels may be stored in non-volatile fashion in a storage medium of the image-recording apparatus. The displacement dependent on the illumination angle for the color channels may be ascertained in the method by calculation from the information about the focal position(s).

Alternatively, or additionally, an astigmatism may be corrected in the method by way of the processing. For the purposes of correcting an astigmatism, the displacement may depend on the illumination angle in relation to one or more planes of the astigmatism.

The displacement may depend on a distance of focal positions for different planes of the imaging optical unit.

In the method, the components of the displacement in the image plane along two orthogonal directions may be determined, in each case depending on the illumination angle.

The displacement which is applied to an image captured at one illumination angle in the method may depend on a position of a beam, incident at the illumination angle, in relation to a plane which is defined by an astigmatism axis and an optical axis of an imaging optical unit.

The displacement which is applied to an image captured at one illumination angle in the method may depend on the position of the beam, incident at the illumination angle, in relation to a first plane which is defined by a first astigmatism axis and the optical axis and in relation to a second plane which is defined by a second astigmatism axis and the optical axis.

In the method, a component of the displacement along a first coordinate axis may depend on a projection of the beam incident at the illumination angle into the first plane.

In the method, a further component of the displacement along a second coordinate axis which is orthogonal to the first coordinate axis may depend on a projection of the beam incident at the illumination angle into the second plane.

Alternatively, or additionally, the method may correct a field curvature.

The displacement which is applied for image correction purposes may be field-point-independent. The same displacement may be applied to each pixel of an image or of a color channel of the image in order to displace the image or the color channel of the image in the image plane.

The displacement which is applied for image correction purposes may be field-point-dependent. As a result, it is also possible to correct distortions, for example caused by field curvature or astigmatism.

For the plurality of illumination angles, the displacement may be respectively stored in non-volatile fashion in a storage medium of the image-recording apparatus and retrieved for image correction purposes. Alternatively, or additionally, information about a defocus for different color channels or different planes of an astigmatism may be stored in non-volatile fashion in a storage medium of the image-recording apparatus, from which the electronic evaluating device calculates the displacement.

In the method, a displacement of an image or of a color channel of an image may comprise rounding of the displacement to an integer pixel spacing.

In the method, a displacement of an image or of a color channel of an image may comprise an interpolation between a plurality of pixel values if the displacement does not equal an integer pixel spacing of the image sensor.

The method may comprise adding the plurality of images after the image correction in order to calculate a results image.

The method may comprise Fourier ptychography using the plurality of images after the image correction. The method may comprise a calculation of a phase and amplitude distribution of the object. The method may comprise a reconstruction of a spectrum of the object in the coordinate space from the images corrected by the image correction, with the phase and amplitude distribution of the object being determined by a Fourier transform.

The method may comprise automatic determination of a focal position and/or the use of the corrected images for phase-contrast methods.

In the method, the image correction may be applied onto an image which was captured for one illumination angle while the detector captures a further image for a further illumination angle at the same time. By parallelizing image correction and recording of further images at different illumination angles, the time required up to the provision of the results image may be reduced further.

The method may be carried out automatically by a microscope system. The images may be captured in a transmission arrangement. The images may be captured in a reflection arrangement.

Apparatuses and methods according to the embodiments allow the use of cost-effective optical units. The recorded images may be processed in a quick, resolution-maintaining and artifact-reducing manner. Field-point-dependent corrections of longitudinal chromatic aberrations or astigmatism are possible.

The features set out above and features that are described below may be used not only in the corresponding combinations explicitly set out, but also in further combinations or in isolation, without departing from the scope of protection of the present invention.

BRIEF DESCRIPTION OF THE FIGURES

The above-described properties, features and advantages of this invention and the way in which they are achieved will become clearer and more clearly understood in association with the following description of the embodiments which are explained in greater detail in association with the drawings.

FIG. 6 and FIG. 7 illustrate ascertaining a displacement applied for a longitudinal chromatic aberration correction to pixels of a color channel.

FIG. 8 illustrates a displacement field for pixels of different color channels for a longitudinal chromatic aberration correction in the case of an image-recording apparatus and a method according to embodiments for one illumination angle.

FIG. 9 illustrates a displacement field for pixels of different color channels for a longitudinal chromatic aberration correction in the case of an image-recording apparatus and a method according to embodiments for a further illumination angle.

DETAILED DESCRIPTION OF EMBODIMENTS

Figure 1:
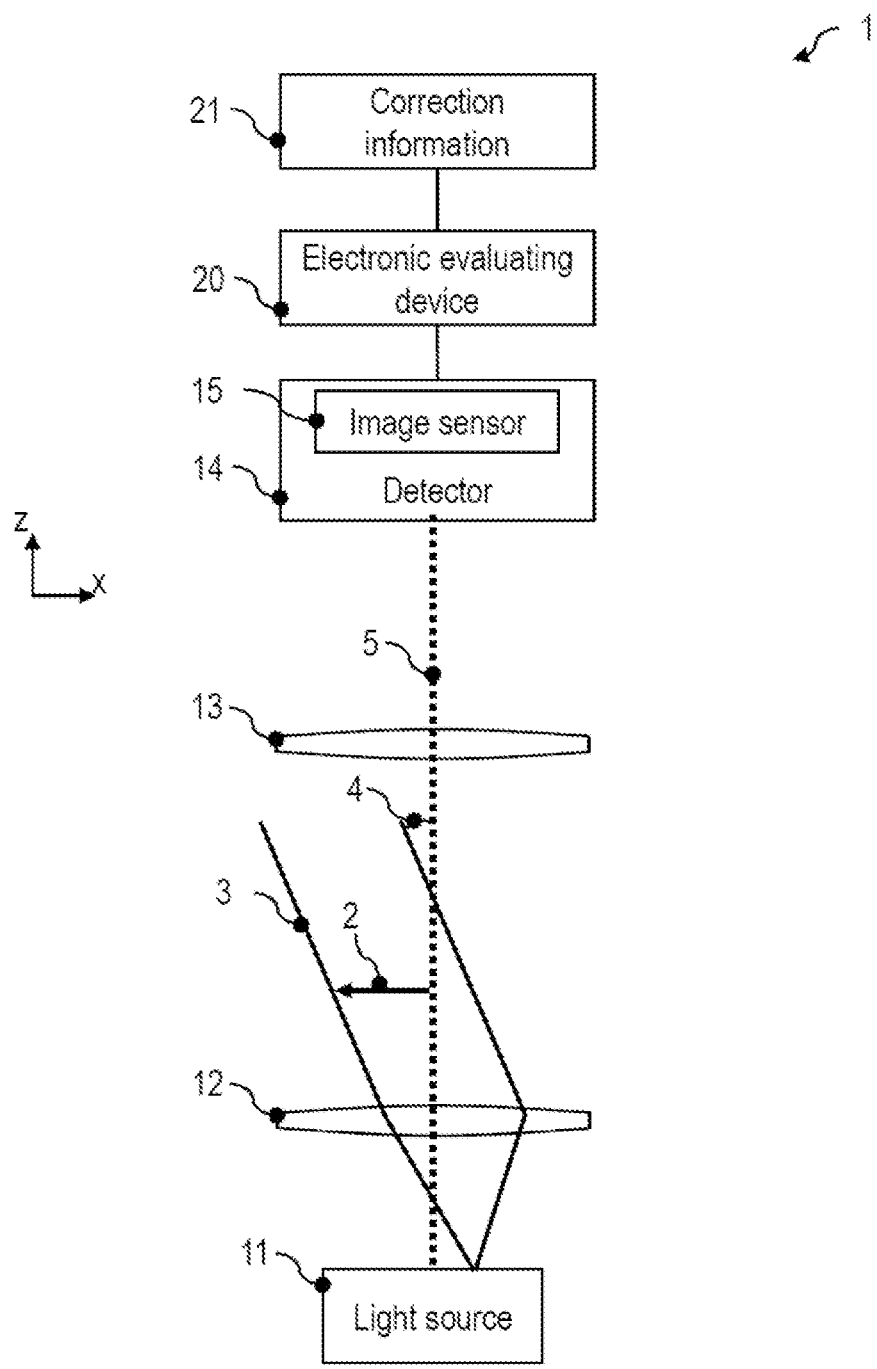
FIG. 1 is a schematic illustration of an image-recording apparatus according to one embodiment.

The present invention is explained in greater detail below on the basis of preferred embodiments with reference to the drawings. In the figures, identical reference signs denote identical or similar elements. The figures are schematic illustrations of various embodiments of the invention. Elements depicted in the figures are not necessarily depicted true to scale. Rather, the different elements depicted in the figures are reproduced in such a way that their function and purpose become comprehensible to the person skilled in the art.

Connections and couplings between functional units and elements as depicted in the figures may also be implemented as indirect connection or coupling. A connection or coupling may be implemented in a wired or wireless manner.

Techniques by means of which optical aberrations which are caused by defocusing of an illumination of an object may be corrected by calculation are described below. Here, a "correction" and "correcting" of optical aberrations are understood to mean measures by means of which the quality of a generated results image may be improved and at least certain optical aberrations, such as e.g. longitudinal chromatic aberrations and/or astigmatism, may be reduced.

As will be described in more detail below, a plurality of images of an object are recorded sequentially in embodiments of the invention. An illumination angle for illuminating the object is set to various values for recording the plurality of images. An image correction is applied to all or some of the images. The image correction may comprise a displacement of pixels in the image plane. The unsharpness in the image plane resulting from a defocus may be reduced by the displacement, said unsharpness being caused, for example, by chromatic aberration or astigmatism.

The image correction may comprise a displacement of an image or of a color channel relative to a further image or a further color channel. The image correction may relate to the whole image or only to individual image regions. The image correction may comprise a displacement of all pixels of one image relative to all pixels of a further image, with the displacement depending on the illumination angle when recording the image. The displacement may be locally constant or locally changeable in the image plane. The image correction may comprise a displacement of pixels of one color channel of an image relative to pixels of a further color channel of the same image, with the displacement depending on the illumination angle when recording the image.

Processing the captured images containing the image correction by computation may be based on data which are stored in non-volatile fashion on a storage medium in an image-recording apparatus. The data may comprise the displacement to be applied in each case for various illumination angles. Alternatively, or additionally, the data may contain information from which an electronic evaluating device ascertains the displacement to be applied.

The data which are used during the operation of the image-recording apparatus for the computational image correction may be determined in advance by computation and stored in the storage medium. Alternatively, or additionally, the data may be generated by a calibration measurement on the image-recording apparatus using reference objects and stored in non-volatile fashion.

By combining the plurality of images after the image correction, the electronic evaluating device is able to automatically generate a results image which contains the information from the plurality of images. The results image may be generated in such a way that it contains a displacement and summation of images, without any of the images needing to be deconvolved with the point spread function (PSF) thereof.

FIG. 1 is a schematic illustration of an image-recording apparatus 1 according to one embodiment. The image-recording apparatus 1 may be configured to automatically carry out methods according to embodiments. The image-recording apparatus 1 may be a microscope system or may comprise a microscope which is provided with a controllable illuminating device, yet to be described in more detail below, a camera comprising an image sensor, and an electronic evaluating device for correcting images.

The image-recording apparatus 1 comprises an illuminating device comprising a light source 11. In a manner known per se, a condenser lens 12 may deflect the light emitted by the light source 11 onto an object 2 to be imaged. The illuminating device is configured in such a way that light may be radiated onto the object 2 at a plurality of different illumination angles 4. By way of example, the light source 11 may comprise a light-emitting diode (LED) arrangement with a plurality of LEDs, which may be individually actuatable, for this purpose. The LED arrangement may be an LED ring arrangement. Alternatively, a controllable element may be arranged in an intermediate image plane, in which a conventional light source is imaged in a magnified manner, in order to provide different illumination angles. The controllable element may comprise a movable pinhole, a micromirror arrangement, a liquid-crystal matrix or a spatial light modulator.

The illuminating device may be configured in such a way that the absolute value of the illumination angle 4, which is included with an optical axis 5, may be modified. The illuminating device may be configured in such a way that a direction of the beam 3, by means of which the object may be illuminated at the illumination angle 4, may also be moved around the optical axis 5 in a polar direction.

A detector 14 of the image-recording apparatus 1 in each case captures at least one image of the object 2 for each one of a plurality of illumination angles, at which the object 2 is illuminated. By way of example, an image sensor 15 of the detector 14 may be configured as a CCD sensor, a CMOS sensor or as a TDI ("time delay and integration") CCD sensor. An imaging optical unit, for example a microscope objective 13 which is only depicted schematically, may generate a magnified image of the object 2 at the image sensor 15.

The image-recording apparatus 1 comprises an electronic evaluating device 20. The electronic evaluating device further processes the plurality of captured images of the object 2 for the plurality of illumination angles. The electronic evaluating device 20 applies an image correction to some or all of the plurality of images. As described in more detail with reference to FIG. 2 to FIG. 15, the image correction in each case contains a displacement which depends on the illumination angle when recording the image. The displacement for image correction purposes may reduce the lateral offset in the image plane, which is caused by longitudinal chromatic aberrations of the illuminating device in the image plane or an intermediate image plane. To this end, the displacement in the image plane may be set depending on a defocus which emerges for a plurality of wavelengths. Pixels of different color channels may be displaced in the image plane by different displacement vectors in order to generate a corrected image. Alternatively, or additionally, the displacement in the image plane may reduce the lateral offset in the image plane which is caused by an astigmatism of the illuminating device. To this end, the displacement in the image plane may be set dependent on the distance between focal positions which emerges for different planes of the astigmatism.

The image-recording apparatus 1 comprises a storage medium with correction information 21. The electronic evaluating device 20 is coupled to the storage medium or may comprise the latter. The electronic evaluating device 20 may ascertain, dependent on the correction information in the storage medium, the image correction to be respectively applied for each illumination angle.

The corrected images which are respectively assigned to one of a plurality of illumination angles may be combined in different ways. By way of example, the images may be added after the image correction. For a reconstruction of amplitude and phase information of the object 2, the images may be used in a Fourier ptychography algorithm. The corrected images may be used to ascertain a focal position or, in any other way, to automatically set the image-recording apparatus 1. The corresponding processing may be carried out automatically by the electronic evaluating device 20.

Since the electronic evaluating device 20 is able to carry out an image correction by applying a displacement to pixels of the images or to color channels of the images, the processing is real-time capable. The image-recording apparatus 1 may comprise a user interface with an optical outputting device, on which the electronic evaluating device 20 may output the generated results image during operation. A deconvolution of individual images with the point spread function thereof, which is complicated from a computational point of view, is no longer mandatory. By combining information from images which were captured in the case of illumination at a plurality of illumination angles, it is also possible to obtain information about those coordinate space frequencies of the object 2 at which the MTF for one of the illumination angles has a zero.

The functionality of the image-recording apparatus according to the embodiments is described in more detail with reference to FIG. 2 to FIG. 15.

Figure 2:
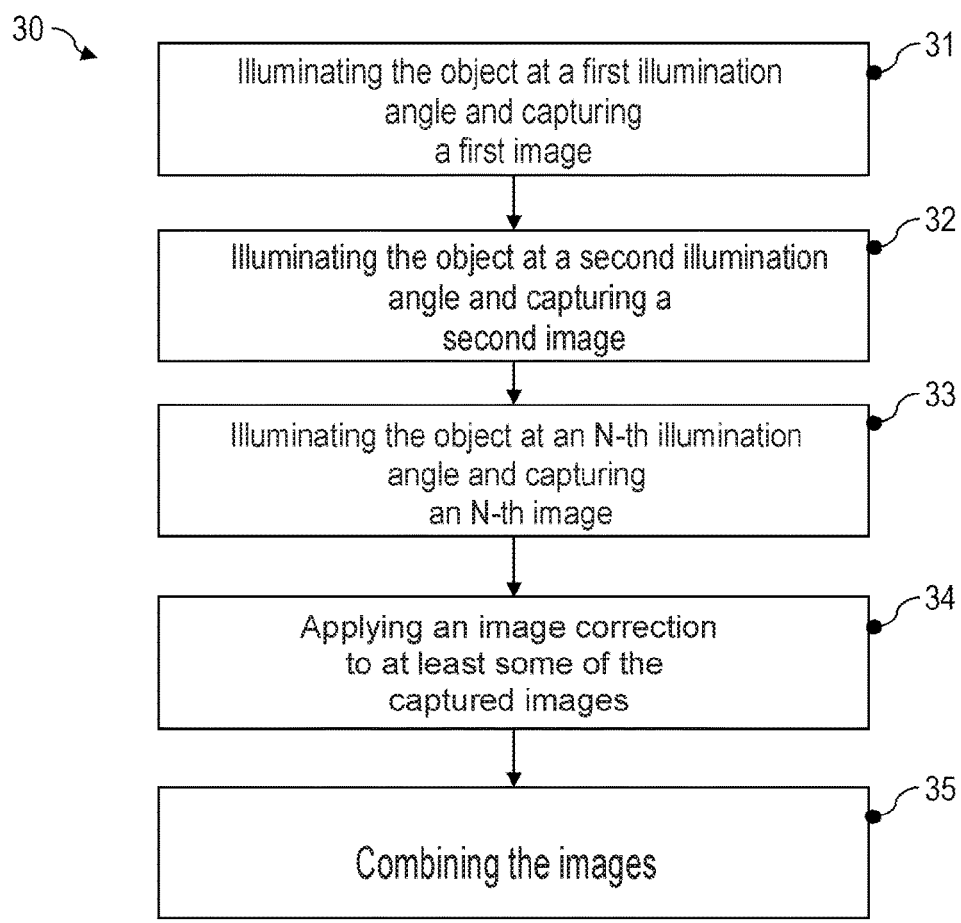
FIG. 2 is a flowchart of a method according to one embodiment.

FIG. 2 is a flowchart of a method 30 according to one embodiment. The method may be carried out automatically by the image-recording apparatus 1.

The object is illuminated at a first illumination angle in step 31. By way of example, the illuminating device may be actuated by the electronic evaluating device 20 in such a way that the object is illuminated at the first illumination angle. The image sensor 15 captures a first image.

The object is illuminated at a second illumination angle which differs from the first illumination angle in step 32. To this end, the illuminating device may be actuated accordingly. The image sensor 15 captures a second image.

Sequentially illuminating the object at different illumination angles and image recording may be repeated.

The object is illuminated at an N-th illumination angle in step 33, where N is an integer >1. To this end, the illuminating device may be actuated accordingly. The image sensor 15 captures an N-th image.

An image correction is applied in step 34 to all N images or to at least some of the N images. The image correction comprises a displacement of pixels in the image plane, said displacement being able to be different for different images. The displacement may be different for different color channels of an image sensor. The image correction may be applied with temporal overlap with the capture of further images. By way of example, a corrected first image may be ascertained by the image correction of the first image while, at the same time, a subsequent image recording takes place in step 32 or 33.

In step 35, the images captured for different illumination angles of the object illumination may be combined by computation. The images may be added to this end. More complicated processing is possible. By way of example, phase information of the object 2 may be determined by calculation from the plurality of images.

Figure 3:
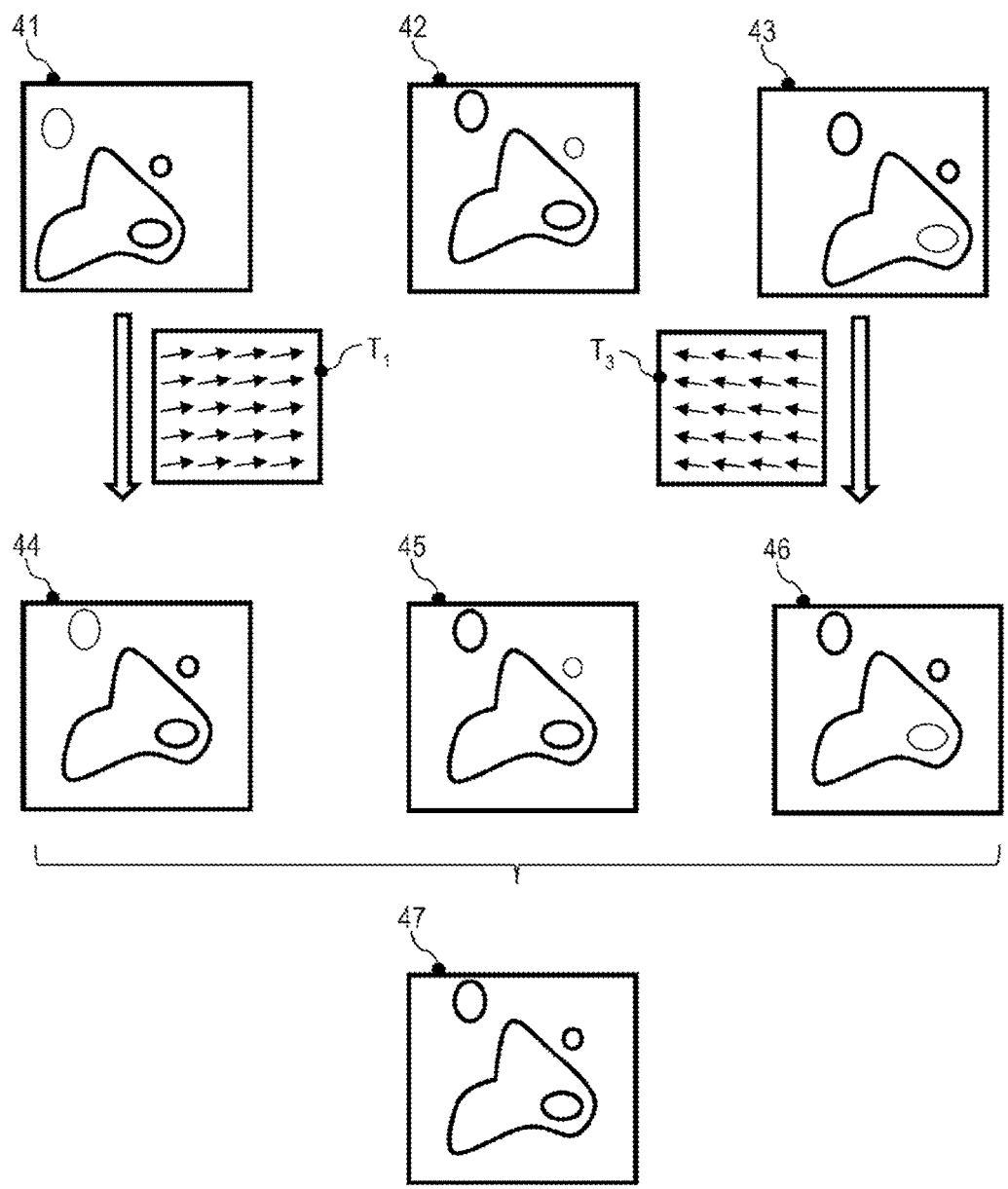
FIG. 3 illustrates the processing of a plurality of images in apparatuses and methods according to embodiments.

FIG. 3 is a schematic illustration for explaining the mode of operation of the image-recording apparatus 1 in more detail.

A first image 41 is captured when illuminating the object at a first illumination angle. A second image 42 is captured when illuminating the object at a second illumination angle. A third image 43 is captured when illuminating the object at a third illumination angle.

The electronic evaluating device 20 displaces the first image 41 by way of a transformation $T_1$ in order to generate a corrected first image 44. The transformation $T_1$ may contain a displacement of all pixels in the image plane. The displacement may be different for different color channels of the first image 41, as will be described in more detail below on the basis of FIG. 4 to FIG. 10.

The electronic evaluating device 20 displaces the third image 43 by way of a transformation $T_3$ in order to generate a corrected third image 46. The transformation $T_3$ may contain a displacement of all pixels in the image plane. The displacement which is applied to the third image 43 may differ from the displacement which is applied to the first image 41. The displacement may be different for different color channels of the third image 44, as will be described in more detail below on the basis of FIG. 4 to FIG. 10.

The second image 42 may also be subjected to an image correction in order to generate a corrected second image 45.

The corrected images 44-46 may be combined with one another. By way of example, a results image 47 may be ascertained by adding the corrected images 44-46. The addition may be used for averaging of the corrected images 44-46.

Alternatively, or additionally, phase and/or amplitude information about the imaged object may also be ascertained from the corrected images 44-46. Automatic focusing onto the object may be carried out. To this end, it is possible, for example, to ascertain the distance of the object and the position thereof relative to a focal plane of the detector 14 from a parallax which is determined for different illumination angles.

As described in more detail with reference to FIG. 4 to FIG. 10, longitudinal chromatic aberrations which, for example, are caused by a chromatic aberration of the detector system or the object illumination may be corrected by image-recording apparatuses and methods according to the embodiments.

For the purposes of a longitudinal chromatic aberration correction, the electronic evaluating device 20 may be configured to locally displace pixels of different color channels relative to one another. At least one direction of the displacement in a image plane may depend on the illumination direction. It is not necessary to locally displace the pixels of all color channels within the scope of the image correction. By way of example, focusing of the system may be carried out in such a way that a focal position for light with a wavelength corresponding to one of the color channels is set as a z-plane. The focal positions of the further color channel or channels are displaced by a defocus in relation to this z-plane in the case of longitudinal chromatic aberrations. The defocus in an intermediate image plane or in a plane of the image sensor may lead to lateral blurring, for example to artifacts at object edges.

By way of example, the different color channels may be the R, G and B channels of an RGB sensor. Other configurations may be used. By way of example, image sensors which have two, three or more than three color channels at defined wavelengths or defined wavelength ranges may be used in specialist applications. The image sensor may comprise an arrangement of pixels which are sensitive at different wavelengths. Each one of the color channels may be sensitive in a wavelength range, with the wavelength ranges of different color channels differing from one another. A plurality of separate image sensors may also be used in order to capture the various color channels. Filters or intrinsic properties of semiconductor regions of the image sensor, for example band gaps of a semiconductor-based image sensor, may be used to set the wavelengths of the color channels. The focal position emerging for light of the wavelength or the wavelength range in which the color channel is sensitive and which is characteristic for the color channel is referred to in abbreviated fashion here as focal position for a color channel. By way of example, the focal position for a color channel may be that focal position which emerges for the centroid wavelength of the sensitivity range of the corresponding color channel.

The electronic evaluating device uses information about the distances between the focal positions for the different color channels for the purposes of correcting the longitudinal chromatic aberration. This information may be ascertained by calculation for the image-recording apparatus 1. Known techniques for simulating optical systems may be used to this end. Alternatively, or additionally, the focal positions for different light wavelengths and/or the distances may also be measured. Reference objects may be used in order to ascertain the information about the focal positions or at least the distance between two focal positions of different color channels by measurements. This information may be stored in non-volatile fashion in a storage medium of the microscope system.

The information about the focal positions and/or the distances thereof is ascertained prior to imaging the object. The information about the focal positions and/or the distances thereof, stored in the image-recording apparatus, may be used subsequently for imaging a multiplicity of objects. The focal positions and/or information about the distances thereof may be ascertained for at least the centroid of the detection spectrum of each color channel. Alternative wavelength may be used, for example the wavelength at which the sensitivity of the corresponding color channel is at maximum.

As an alternative or in addition to ascertaining by calculation the displacement depending on the illumination angle by simulating the optical properties and/or by calibration, the displacement may also be ascertained by registering different color channels or different images to one another. To this end, use may be made of various registration methods known per se. By way of example, use may be made of an SSIM ("structural similarity") index in order to carry out a registration and ascertain the displacement.

For the purposes of the longitudinal chromatic aberration correction, the following procedure may be carried out for each one of the plurality of images which were captured with object illumination at the plurality of illumination angles: The individual color channels of the image are assigned to different wavelengths. By way of example, the color channels may have different centroids of the detection spectrum. Accordingly, a focal position which emerges for the respective wavelength may be assigned to each one of the color channels.

A local displacement across the optical axis is ascertained in a manner dependent on the distance between the focal position of one color channel and the focal position of a further color channel. The displacement emerges from the z-defocus in combination with the illumination at the illumination angle. Depending on the illumination direction, the displacement may have different directions in the image plane. A direction of the displacement may depend on whether the color channel is displaced in intra-focal or extra-focal fashion relative to the further color channel. By way of example, the displacements for two of three color channels of an RGB image sensor may exhibit in opposite directions if one of the color channels has an intra-focal displacement relative to the further color channel, for which focusing is carried out on the plane of the image sensor, and another one of the color channels has an extra-focal displacement relative to the further color channel, for which focusing is carried out on the plane of the image sensor.

One or more color channels of the image, i.e. one or more image channels, are displaced in accordance with the ascertained displacement. In this way, it is possible to compensate for the lateral offset between color channels which is caused by the defocusing. To this end, all pixels of the corresponding color channel may be displaced locally relative to the pixels of a further color channel within the scope of computational processing. It is not mandatory for all image channels to be displaced. By way of example, three image channels for R, G, B may be present. The optical unit of the image-recording system may be set automatically in such a way that one of the color channels is focused precisely onto the plane of the image sensor. Then, it is possible for only the two other color channels to be displaced relative to this color channel for the purposes of a longitudinal chromatic aberration correction.

If a total of m color channels are present for each image, m−1 of the color channels may be displaced during the longitudinal chromatic aberration correction. Here, the displacement may be different for different color channels and may depend in each case on the z-defocus for the corresponding color channel. The influence of the defocus on the illumination may be corrected by the longitudinal chromatic aberration correction.

The plurality of images may be processed further after the image correction. By way of example, the plurality of images may be summed in order to generate a results image.

Figure 4:
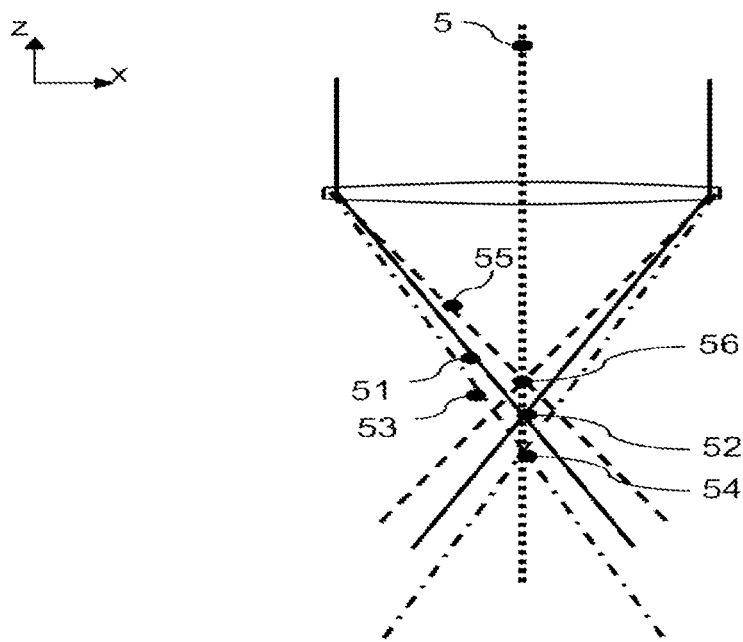
FIG. 4 illustrates the application of an image-recording apparatus and a method according to embodiments for a longitudinal chromatic aberration correction.
Figure 5:
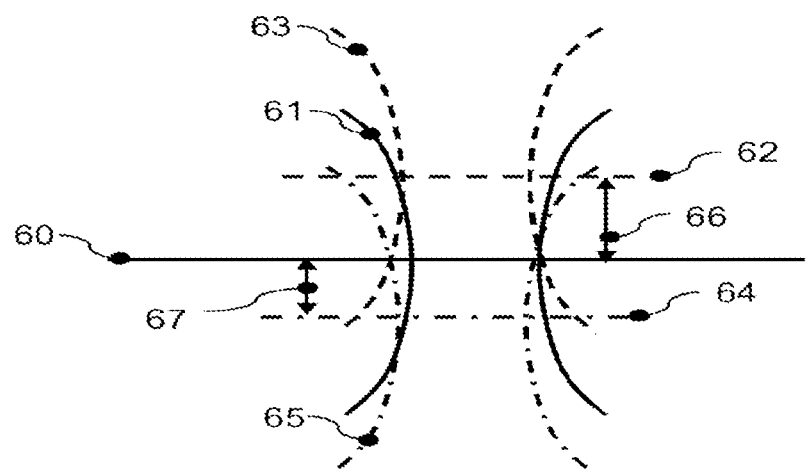
FIG. 5 illustrates point spread functions due to chromatic aberration, which are corrected by an image-recording apparatus and a method according to the embodiments.

FIG. 4 and FIG. 5 illustrate the variables used for the longitudinal chromatic aberration correction. Chromatic aberration leads to a first focal position 52 for light with a first wavelength 51, to a second focal position 54, different therefrom, for light with a second wavelength 53 and to a third focal position 56, different therefrom, for light with a third wavelength 55. The focal positions 52, 54, 56 may be measured or ascertained by calculation, before the image-recording apparatus 1 is used for imaging the object. By way of example, the focal positions may be the focal positions in the vicinity of the image sensor or in an intermediate image plane.

The first wavelength, for which the first focal position 52 results, may be the centroid wavelength of the detection band of a first color channel of the image sensor 15. Alternatively, the first wavelength may also be a different characteristic wavelength of the detection band of the first color channel, for example the wavelength at which the sensitivity is at a maximum. The second wavelength, for which the second focal position 54 results, may be the centroid wavelength of the detection band of a second color channel of the image sensor 15. Alternatively, the second wavelength may also be a different characteristic wavelength of the detection band of the second color channel, for example the wavelength at which the sensitivity is at a maximum. The third wavelength, for which the third focal position 56 results, may be the centroid wavelength of the detection band of a third color channel of the image sensor 15. Alternatively, the third wavelength may also be a different characteristic wavelength of the detection band of the third color channel, for example the wavelength at which the sensitivity is at a maximum.

FIG. 5 illustrates the point spread functions for the different wavelengths on account of longitudinal chromatic aberrations of the illuminating device. A point spread function 61 for light at the first wavelength has a minimum diameter in a z-plane 60. By way of example, the z-plane 60 may be the plane of the image sensor or an intermediate image plane of the system. A point spread function 63 for light at the second wavelength has a minimum diameter in a plane 62. That is to say, there is a z-defocus 66 corresponding to the distance between the planes 60, 62. A point spread function 65 for light at the third wavelength has a minimum diameter in a plane 64. That is to say, there is a z-defocus 67 corresponding to the distance between the planes 60, 64.

When illuminating at different illumination angles, the z-defocus 66, 67 leads to a lateral displacement of different color channels relative to one another. The optical aberration may be reduced by displacing the data of one or more color channels in the image plane relative to the data of a further color channel.

The detector 14 is configured in such a way that the detector depth-of-field thereof is greater than the z-defocus 66, 67. Then, the image correction described in more detail below may be carried out in order to efficiently reduce the longitudinal chromatic aberration by calculation.

FIG. 6 and FIG. 7 illustrate determining the displacement of pixels of a color channel, which may be carried out within the scope of the image correction. The defocus $\Delta z$ which is caused for a wavelength by longitudinal chromatic aberrations may be corrected by displacing the pixels of one color channel, which is sensitive at the corresponding wavelength, by $$\Delta x_j = sf \cdot \tan(\theta_x) \cdot \Delta z_j \quad (1)$$

in the x-direction and by $$\Delta y_j = sf \cdot \tan(\theta_y) \cdot \Delta z_j \quad (2)$$

in the y-direction. Here, j denotes an index for the color channel. The value $\Delta z_j$ denotes the distance between the focal position of the wavelength, which may e.g. be the centroid wavelength of the color channel j, and a reference color channel, which is different therefrom and the focal position of which may be selected corresponding to the z-plane. The factor sf is a scaling factor. The scaling factor may be used to carry out a conversion from distances in the intermediate image plane, which is imaged by the detector in the plane of the image sensor, to distances in the plane of the image sensor. The scaling factor may have a negative sign. For the purposes of reconstructing the object, the scaling factor may also have an absolute value equaling one.

The angle $\theta_x$ denotes the illumination angle in the xz-plane. By way of example, the angle $\theta_x$ may be determined from the projection of a beam which is incident on the xz-plane at the illumination angle. The angle $\theta_x$ may define the angle between the projection of a beam incident on the xz-plane at the illumination angle and the z-axis which defines the optical axis. The angle $\theta_y$ denotes the illumination angle in the yz-plane. By way of example, the angle $\theta_y$ may be determined from the projection of a beam which is incident on the yz-plane at the illumination angle. The angle $\theta_y$ may define the angle between the projection of a beam incident on the yz-plane at the illumination angle and the z-axis which defines the optical axis.

If the image sensor has more than two color channels, the focal positions for the wavelengths which are characteristic for a first color channel and a third color channel may be arranged on different sides of the plane which is perpendicular to the optical axis and in which the focus for the wavelength which is characteristic for the second color channel is arranged. In this case, the image-recording apparatus may be set in such a way that the focal position for the wavelength which is characteristic for the second color channel defines the z=0 plane, which is focused onto the image sensor. The pixels of the first color channel and the pixels of the third color channel in each case may be displaced relative to the pixels of the second color channel in the xy-plane of the image sensor. In such a case, as is depicted in an exemplary manner in FIG. 4 and FIG. 5, the defocus $\Delta z_j$ has different signs for the first color channel (j=1) and the third color channel (j=3). The image captured in the first color channel and the image captured in the third color channel may be displaced in opposite directions in order to correct the longitudinal chromatic aberration. The direction of the displacement in each case may depend on the illumination direction defined by the angles $\theta_x$ and $\theta_y$. The absolute value of the displacement may be different if the absolute value of the defocus for the first color channel and absolute value of the defocus for the third color channel are different. In this case, the absolute value of the displacement may be set proportionally dependent on the defocus for the respective color channel.

FIG. 8 schematically shows a displacement field 75, which is applied to pixels of one color channel of an image for a first illumination angle. All pixels may be displaced by the same displacement in the x-direction and y-direction. A different displacement field 76 may be applied by the electronic evaluating device to pixels of a different color channel of the same image. Pixels of a further color channel may remain non-displaced if the defocus for this further color channel equals zero. The displacement field 75 and the other displacement field 76 may define displacements in directions rotated by 180°. This may be the case, in particular, if the chromatic aberration for one of the wavelengths leads to an intermediate image displaced in intra-focal fashion and the chromatic aberration for another one of the wavelengths leads to an intermediate image displaced in extra-focal fashion.

FIG. 9 schematically shows the displacement fields 77, 78, which are applied if the image is recorded with an illumination at a different illumination angle. The displacement changes with the illumination angle. The direction and the absolute value of the displacement may be different for different illumination angles.

While FIG. 8 and FIG. 9 schematically depict displacement fields which are constant in the plane of the image sensor, i.e. which define a displacement of all pixels of a color channel by the same vector which depends on the illumination angle, the displacement may also vary in space. By way of example, an astigmatism or a field curvature may also be corrected by such a spatially varying displacement field which defines the transformation applied to the pixels of an image or of a color channel of the image.

Figure 10:
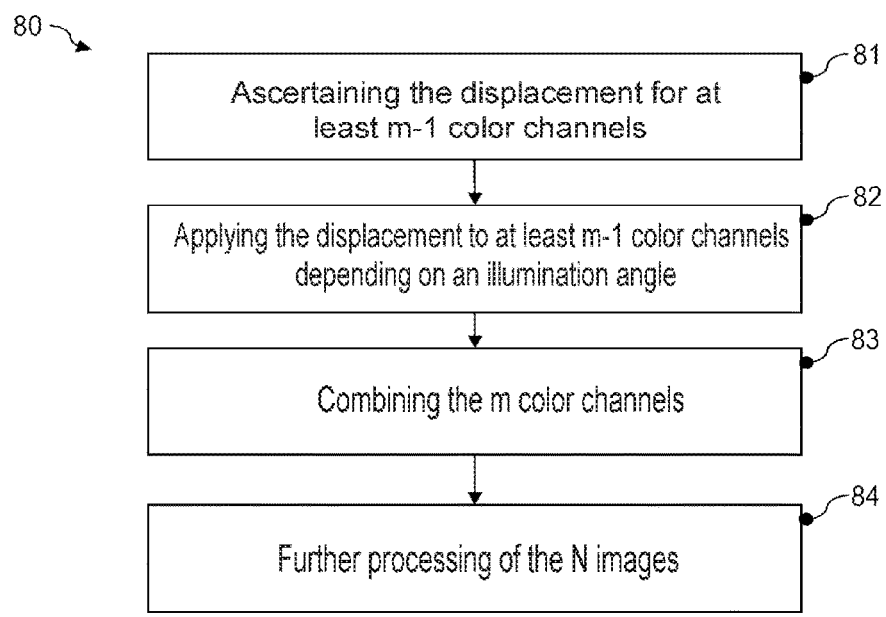
FIG. 10 is a flowchart of a method according to one embodiment for a longitudinal chromatic aberration correction.

FIG. 10 is a flowchart of a method 80 for correcting a longitudinal chromatic aberration. The method may be carried out automatically by the electronic evaluating device 20. The detector may have m color channels. The image-recording apparatus may be set in such a way that no defocus is present for one of the color channels.

In step 81, it is possible to establish the offset by means of which the data of each of the at least m−1 color channels, for which the defocus does not equal zero, are displaced. The offset depends on the illumination angle when recording the image. By way of example, the offset may be defined in accordance with equations (1) and (2).

The offset resulting from the longitudinal chromatic aberration and the displacement, which corrects the former again by calculation, may be ascertained in different ways. In one configuration, the information about the focal positions of the wavelengths which are assigned to different color channels may be stored in a non-volatile fashion in a storage medium of the image-recording apparatus. Then, the electronic evaluating device is able to calculate the displacement. In a further configuration, the displacement itself may already be stored on a characteristic field basis. Numerous further configurations, in which the electronic evaluating device uses information about chromatic aberrations ascertained in advance to carry out the image correction, are possible. By way of example, a linear map, which in each case defines how pixels of the recorded image are mapped to pixels of the corrected image for a plurality of color channels and a plurality of illumination angles, may be stored in non-volatile fashion.

A plurality of color channels are displaced in step 82. By way of example, two of the R, G and B image channels may be shifted relative to one of these image channels. Here, it is possible, for example, for all pixels of the R image channel to be displaced by the same number of pixels in the x-direction and y-direction relative to the pixels of the G image channel. It is possible for all pixels of the B image channel to be displaced by the same number of pixels in the x-direction and y-direction relative to the pixels of the G image channel. The displacement for the R image channel and the B image channel may differ in terms of direction and/or absolute value. The displacement may be carried out in such a way that, with the exception of the pixels on the image edge, pixels from the image channels displaced in the image plane are once again arranged congruent with pixels of the non-displaced image channel. To this end, e.g. rounding and/or interpolation may be carried out, as still described in more detail on the basis of FIG. 15.

The corrected image resulting for the illumination direction may be ascertained in step 83.

Steps 81 to 83 may be carried out for each one of N images, which were captured for N different illumination angles, where N>2 and, in particular, N>>2 may apply.

In step 84, the N images may be combined after the image correction. The images may be summed. It is possible to ascertain amplitude and/or phase information images in the coordinate space or in the Fourier space.

Figure 11:
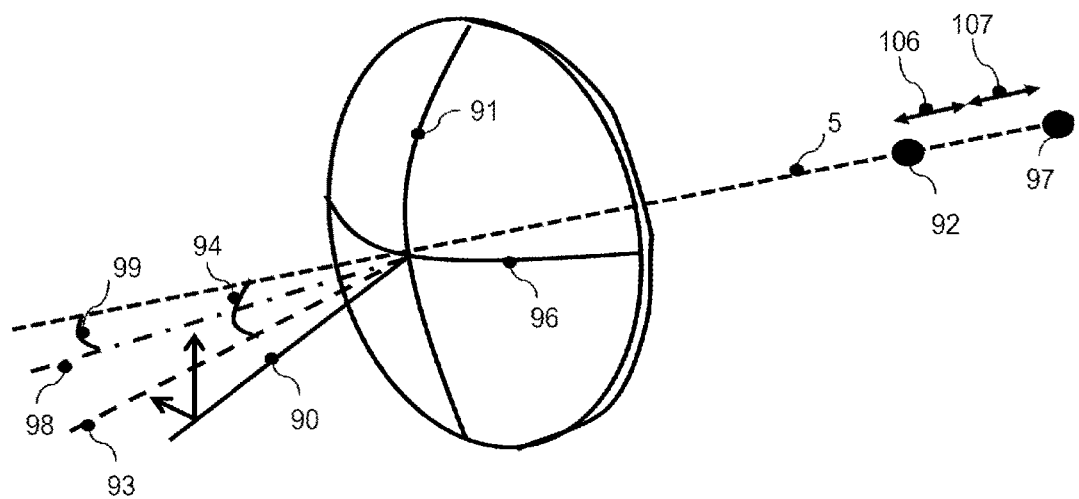
FIG. 11 illustrates the application of an image-recording apparatus and a method according to embodiments for an astigmatism correction.
Figure 12:
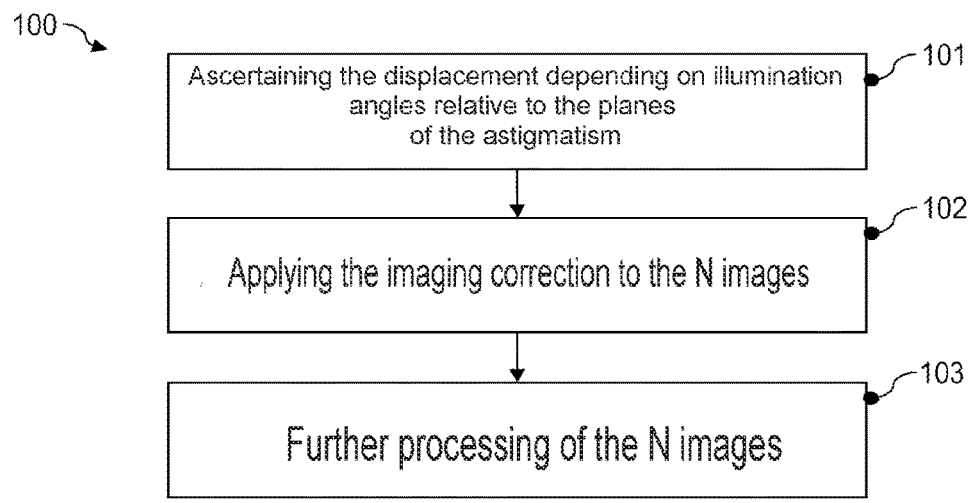
FIG. 12 is a flowchart of a method according to one embodiment for an astigmatism correction.
Figure 13:
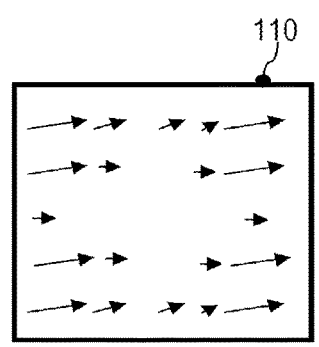
FIG. 13 illustrates a field-point-dependent displacement field in an image-recording apparatus and a method according to embodiments.

The image-recording apparatus and methods according to the embodiments may also be used, as an alternative or in addition to the longitudinal chromatic aberration correction, for correcting other optical aberrations, for example for correcting an astigmatism, as described in more detail on the basis of FIG. 11 to FIG. 13.

FIG. 11 shows a partial view of an image-recording apparatus according to one embodiment, in which an optical unit only depicted schematically, for example of the illuminating device, has an astigmatism. A first meridian 91 extends in a first plane of the astigmatism. The first plane of the astigmatism may define a first focal position 92. A second meridian 96 extends in a second plane of the astigmatism. The second plane of the astigmatism may define a second focal position 97. The first plane may be the plane for which a minimum focal length emerges. The second plane may be the plane for which a maximum focal length emerges.

One or more of the focal positions 92, 97 may be displaced in relation to the z=0 plane, which is imaged in focus by the detector. The focal positions 92, 97 may have a z-defocus 106, 107 along the optical axis. The z-defocus may vary in a field-point-dependent manner.

When the object is illuminated at an illumination angle, the light may be incident along a beam 90, the direction of which is fixed by the respectively set illumination angle. There may be a projection into the planes of the astigmatism for the purposes of correcting the astigmatism. These planes may be defined in each case by a meridian of an optical component and the optical axis, with different meridians being assigned to different focal planes. A projection 93 of the beam 90 incident at the illumination angle into the first plane includes an angle 94 with the optical axis 5. The angle 94 may also be denoted angle $\theta_a$. A projection 98 of the beam 90 incident at the illumination angle into the second plane includes an angle 99 with the optical axis 5. The angle 99 may also be denoted angle $\theta_b$. The plane defined by the first plane of the astigmatism need not coincide with the x-axis or y-axis of the image sensor. However, by way of a coordinate transform in the plane of the image sensor known per se, the coordinate axes may also be defined in such a way that, for example, the line of intersection of the first plane of the astigmatism and the plane of the image sensor corresponds to the x-axis and the line of intersection of the first plane of the astigmatism with the plane of the image sensor corresponds to the y-axis.

For the purposes of correcting the astigmatism, the pixels of an image may be displaced by a displacement relative to the pixels of a further image. The displacement may depend on the illumination angle. The displacement may depend on the z-defocus 106, 107, which emerges for the plurality of planes of the astigmatism.

By way of example, the displacement in the plane of the image sensor may be defined by $$sf \tan(\theta_a) \cdot \Delta z_a \quad (3)$$

in the direction defined by the line of intersection of the first plane of the astigmatism with the sensor plane and by $$sf \tan(\theta_b) \cdot \Delta z_b \quad (4)$$

in the direction defined by the line of intersection of the second plane of the astigmatism with the sensor plane. Here, $\Delta z_a$ denotes the z-defocus 106 for the first plane of the astigmatism, $z_b$ denotes the z-defocus for the second plane of the astigmatism and sf denotes a scaling factor for converting a displacement resulting from the z-defocus in the intermediate image plane into a displacement in the plane of the image sensor. The scaling factor sf is fixed by the image-recording apparatus and may be ascertained, for example, by computation or in a calibration measurement.

If the planes of the astigmatism are tilted relative to the x-coordinate axis and y-coordinate axis of the image sensor, the displacement in the x-coordinate axis and y-coordinate axis of the image sensor may be ascertained by an appropriate transformation. By way of example, if the line of intersection of the first plane of the astigmatism with the x-axis of the image sensor includes an angle φ and the line of intersection of the first plane of the astigmatism with the y-axis of the image sensor includes the angle φ, the coordinates of the displacement may be ascertained as:

$$\Delta x = \cos(\phi) \cdot sf \cdot \tan(\theta_a) \cdot \Delta z_a + \sin(\phi) \cdot sf \cdot \tan(\theta_b) \cdot \Delta z_b \quad (5)$$

in the x-direction and by $$\Delta y = \cos(\phi) \cdot sf \cdot \tan(\theta_b) \cdot \Delta z_b - \sin(\phi) \cdot sf \cdot \tan(\theta_a) \cdot \Delta z_a \quad (6)$$

in the y-direction.

The same displacement may be applied to the same pixel of all color channels. If chromatic aberrations are also corrected, the displacements may be different for different color channels, as described with reference to FIG. 3 to FIG. 10.

A field-point dependence of the astigmatism may be taken into account by a field-point-dependent displacement of pixels. The field of displacement vectors, by means of which pixel values are displaced in the plane of the image sensor, may be changeable in the plane of the image sensor.

FIG. 12 is a flowchart of a method 100. The method 100 may be carried out automatically by the image-recording apparatus 1.

In step 101, the displacements which are to be applied to pixels of an image, which was captured in the case of illumination at an illumination angle, for the purposes of astigmatism correction are ascertained.

In order to ascertain the displacement, the illumination angle may be projected into the planes defined by the astigmatism, as described with reference to FIG. 11. The displacement to be applied to the image may be ascertained from the distances of the focal positions of the minimum focal length and maximum focal length of the astigmatic system from the plane in which the detector is focused in combination with the projection of the illumination angle into the associated planes of the astigmatism.

The information required for the image correction may be stored in different ways in the image-recording apparatus in non-volatile fashion. The displacements to be applied may be stored as characteristic fields dependent on the illumination angle. Information about the focal lengths of the optical system having the astigmatism may be stored in combination with information about the position of the planes of the astigmatism. The electronic evaluating device may process this information further by calculation in order to establish how the pixels of the image are to be displaced during the image correction. It is also possible to store a linear map for each of a plurality of illumination angles, said linear map defining how pixels of the image recorded at an illumination angle are mapped to pixels of the corrected image.

Step 101 may be carried out for each of N images which were captured with illumination at N different illumination angles.

In step 102, the displacement ascertained in each case is applied to an image. The displacement may be carried out in such a way that, with the exception of the pixels on the image edge, pixels from the image displaced in the image plane are once again arranged congruent with pixels of the image sensor. To this end, e.g. rounding and/or interpolation may be carried out, as still described in more detail on the basis of FIG. 15. Step 102 may be carried out in such a way that, for each of the N images, the image correction assigned to the illumination angle is carried out for astigmatism correction purposes.

In step 103, the N images may be combined after the image correction. The images may be summed. It is possible to ascertain amplitude and/or phase information images in the coordinate space or in the Fourier space.

FIG. 13 illustrates a displacement field 110, by means of which pixels of an image may be displaced in the image plane in order, for example, to correct the influence of different focal lengths in an optical system with astigmatism.

The displacement field 110 may define a displacement which changes in a spatially dependent manner in the plane of the image. A direction and/or an absolute value of the displacement vector may be locally changeable. As a result, it is also possible to correct spatially dependent changeable distortions which are caused by an astigmatism.

While image-recording apparatuses and methods, by means of which a longitudinal chromatic aberration correction and an astigmatism correction may be carried out, were described in an exemplary manner with reference to FIG. 1 to FIG. 13, the techniques described here may also be used for correcting other aberrations, for example for correcting field curvature.

Figure 14:
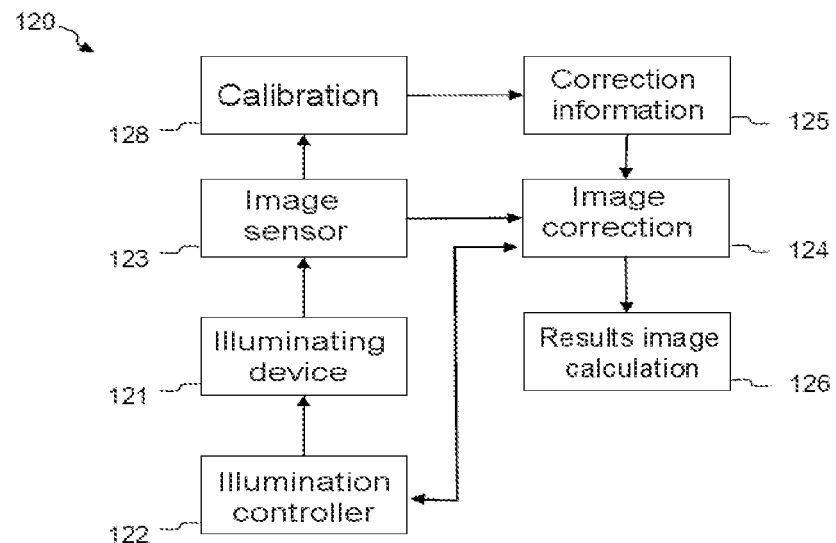
FIG. 14 is a block diagram of an image-recording apparatus according to one embodiment.

FIG. 14 is a block diagram 120 of an image-recording apparatus according to one embodiment. The image-recording apparatus may be configured for automatic longitudinal chromatic aberration correction and/or astigmatism correction.

The image-recording apparatus comprises a controllable illuminating device 121. The object may be illuminated sequentially at a plurality of different illumination angles by means of the illuminating device 121. An illumination controller 122 may control the sequentially set illumination angles. The illuminating device 121 may comprise an LED arrangement. The illuminating device 121 may comprise a controllable optical element in an intermediate image plane, said controllable optical element, for example, being able to comprise a movable pinhole, a micromirror arrangement, a liquid crystal matrix or a spatial light modulator.

An image sensor 123 captures at least one image for each one of the illumination angles at which the object is illuminated. The image may comprise information in a plurality of color channels. The image sensor 123 may comprise at least one CCD chip or CMOS chip.

A module for image correction 124 may carry out an image correction. The image correction may depend on the illumination angle used during the image recording. The image correction may comprise a displacement of pixels in one, several or all color channels of the image. The displacement may be the same for all displaced pixels or may be locally variable in the image plane.

A storage medium with correction information 125 may store information used by the module for image correction 124 in various forms. The correction information may contain information about focal positions for different wavelengths and/or different planes of the astigmatism, from which the displacement to be applied is calculated by the module for image correction 124. The correction information may specify the displacement for different illumination angles. The correction information may define a linear map, for example in the form of an imaging matrix, according to which pixels of the original image are mapped to pixels of a corrected image during the image correction.

The module for image correction 124 may be configured as an application-specific specialist circuit, controller, micro-controller, processor or microprocessor. The module for image correction 124 may be combined with the image sensor 123 in one structural unit which automatically calculates corrected images. As a result, the image correction may be encoded in hardware.

The image-recording apparatus may be configured in such a way that the correction information is ascertained by measurements on the image-recording apparatus itself. The image-recording apparatus may comprise a module for calibration 128, which automatically ascertains the correction information. To this end, recordings of a plurality of known reference objects may be made and processed further by calculation in order to determine how the images need to be corrected in order to reconstruct an object.

The image-recording apparatus may comprise a module for image combination 126, by means of which the N corrected images may be combined. The images ascertained after the image correction may be summed or processed further in any other way in order to determine a results image.

The image-recording apparatus may comprise further units. By way of example, a unit for setting the autofocus may be present. The unit for setting the autofocus may use the parallax, which results for different illumination angles, as an input variable.

In general, a corrected image is ascertained from an image I for displacement purposes, wherein $$I_c(u,v;j)=I(u-\Delta x_j, v-\Delta y_j; j). \tag{7}$$

Here, u and v denote pixel coordinates along the x-direction and y-direction of the image sensor. The index j may denote a color channel. The displacements may depend on the color channel if chromatic aberrations are intended to be corrected, or they may be independent of the color channel.

Since the displacements ascertained according to equations (1) to (6) do not necessarily define a displacement by an integer number of pixels, it is possible to carry out rounding or interpolation operations in order to ensure that a consistent pixel coordinate system is used for different images and/or different color channels.

By way of example, rounding may be provided, and so $$I_c(u,v;j)=I(u-\text{round}(\Delta x_j), v-\text{round}(\Delta y_j); j) \tag{8}$$

establishes the corrected image. Here, round (•) denotes the rounding function. It is also possible to use the floor function $\lfloor • \rfloor$ or ceiling function $\lceil • \rceil$ instead of the rounding function in equation (8). Rounding may already be taken into account if the displacement is stored in non-volatile fashion in the image-recording apparatus.

It is also possible to carry out an interpolation between different pixel values. Here it is possible, for example, to interpolate four pixel values, or else more than four pixel values, in order to ascertain the displaced image during the image correction.

Figure 15:
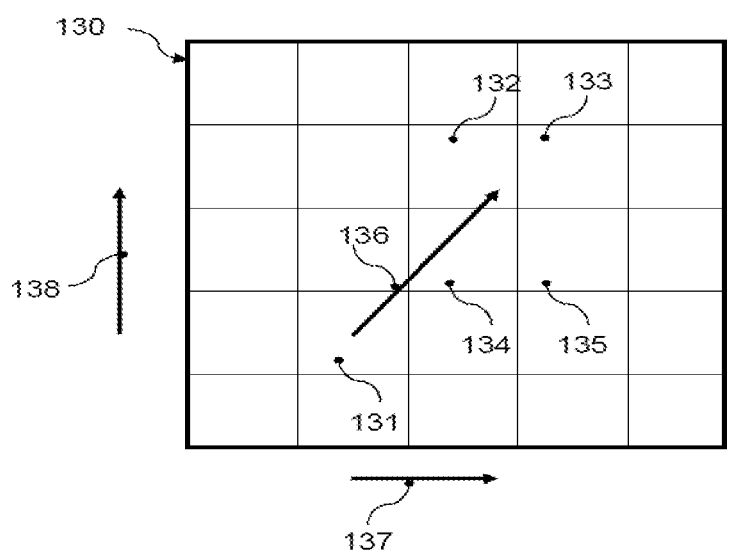
FIG. 15 illustrates various techniques for applying a displacement to an image or a color channel of an image.

FIG. 15 illustrates the displacement of pixels during the image correction. The image sensor has an arrangement of pixels 130. The displacement vector 136, for example ascertained according to equations (1) to (6), may be such that the components of the displacement vector 136 are not integer multiples of the pixel distances in the two coordinate directions 137, 138. By way of example, the pixel 131 may be displaced to the pixel 132 when a rounding operation is applied. During interpolation, the pixel values of the pixels 132-135 may be linearly interpolated in order to ascertain the pixel value for the pixel 131 in the corrected image.

While embodiments were described with reference to the figures, developments may be realized in further embodiments. While the image-recording apparatus according to the embodiments may, in particular, be a microscope system, the described techniques may also be used in other imaging systems. While the described techniques for longitudinal chromatic aberration correction and/or astigmatism correction may be used, other optical aberrations also may be corrected alternatively or additionally. The corrected images may be combined with one another in a multiplicity of different ways. By way of example, the corrected images may be used for Fourier ptychography or added for ascertaining a results image.

The invention claimed is:

1. An image-recording apparatus comprising:
an illuminating device which is controllable in order to set a plurality of illumination angles for illuminating an object;
a detector comprising an image sensor, which comprises a plurality of color channels configured to capture a plurality of images of the object for the plurality of illumination angles;
an electronic evaluating device for processing the plurality of images, coupled to the image sensor, wherein the electronic evaluating device is configured to apply an image correction to at least some of the plurality of images, said image correction comprising a displacement, wherein the displacement depends on the illumination angle used when recording the respective image, and wherein the displacement depends on the respective color channel and wherein the displacement for the respective color channel depends on a distance between a focal position for the color channel and a further focal position for a further color channel and
wherein the electronic evaluating device is configured to combine the plurality of images after the image correction.

2. The image-recording apparatus as claimed in claim 1, wherein the electronic evaluating device is configured to correct longitudinal chromatic aberrations by way of the processing.

3. The image-recording apparatus as claimed in claim 1, wherein the distance and/or the focal position are stored in non-volatile fashion in a storage medium of the image-recording apparatus.

4. The image-recording apparatus as claimed in claim 1, wherein the electronic evaluating device is configured to correct an astigmatism.

5. The image-recording apparatus as claimed in claim 4, wherein the displacement which is applied to an image captured at one illumination angle depends on a position of a beam, incident at the illumination angle, in relation to a plane which is defined by an astigmatism axis and an optical axis of an imaging optical unit.

6. The image-recording apparatus as claimed in claim 5, wherein the displacement which is applied to an image captured at one illumination angle depends on the position of the beam, incident at the illumination angle, in relation to a first plane which is defined by a first astigmatism axis and the optical axis and in relation to a second plane which is defined by a second astigmatism axis and the optical axis.

7. The image-recording apparatus as claimed in claim 6, wherein a component of the displacement along a first coordinate axis depends on a projection of the beam incident at the illumination angle into the first plane, and
wherein a component of the displacement along a second coordinate axis which is orthogonal to the first coordinate axis depends on a projection of the beam incident at the illumination angle into the second plane.

8. The image-recording apparatus as claimed in claim 1, wherein the electronic evaluating device is configured to correct a field curvature.

9. The image-recording apparatus as claimed in claim 1, wherein the displacement is field-point-dependent.

10. The image-recording apparatus as claimed in claim 1, wherein, for the plurality of illumination angles, the displacement is respectively stored in non-volatile fashion in a storage medium of the image-recording apparatus.

11. The image-recording apparatus as claimed in claim 1, wherein the electronic evaluating device is configured to add the plurality of images after the image correction in order to calculate a results image.

12. The image-recording apparatus as claimed in claim 1, wherein the electronic evaluating device is configured to apply the image correction onto an image which was captured for one illumination angle while the detector captures a further image for a further illumination angle.

13. The image-recording apparatus as claimed in claim 1, wherein the image-recording apparatus is a microscope system.

14. A method for recording images, comprising:
capturing a plurality of images when an object is illuminated at a plurality of illumination angles using an image sensor comprising a plurality of color channels; and
processing the plurality of images, wherein the processing comprises:
applying an image correction to at least some of the plurality of images, wherein the image correction depends on a respective color channel and comprises a displacement which depends on the illumination angle when recording the respective image wherein the displacement for a color channel depends on a distance between a focal position for the color channel and a further focal position for a further color channel; and
combining the plurality of images after applying the image correction.

15. The method as claimed in claim 14, further comprising correcting an astigmatism, wherein the displacement which is applied to an image captured at one illumination angle depends on a position of a beam, incident at the illumination angle, in relation to a plane which is defined by an astigmatism axis and an optical axis of an imaging optical unit.

16. The method as claimed in claim 14, further comprising correcting an astigmatism, wherein the displacement which is applied to an image captured at one illumination angle depends on the position of the beam, incident at the illumination angle, in relation to a first plane which is defined by a first astigmatism axis and the optical axis and in relation to a second plane which is defined by a second astigmatism axis and the optical axis.

* * * * *